2,959,563

RESINOUS 1-MONOOLEFINIC HYDROCARBON COMPOSITIONS STABILIZED WITH SILICON MONOXIDE

James B. Haehn, Lorain, and Robert J. Ettinger, Cleveland, Ohio, assignors to The B. F. Goodrich Company, New York, N.Y., a corporation of New York No Drawing. Filed July 20, 1956, Ser. No. 599,016

8 Claims. (Cl. 260—41)

The present invention relates generally to olefin polymer compositions of stable dielectric characteristics. More specifically, the present invention relates to formulations containing olefin polymers, most specifically polyethylene, having a low power factor under conditions of outdoor weathering and to electrical insulation made therefrom.

Polymers of 1-olefins such as those of ethylene, propylene and isobutylene or copolymers thereof are known to be excellent insulating materials. Polyethylene resin has shown a steadily increasing use in the wire and cable industry. While initially an excellent dielectric, the dielectric properties of virgin polyethylene are not stable on exposure to ultraviolet light and moisture such as are encountered on outdoor exposure. When so exposed the power factor shows a steady increase with time and the maximum power factor limits are likely to be exceeded before an economically useful life period has expired.

Polyethylene is conventionally stabilized against the effects of ultraviolet light by the addition of finely-divided carbon blacks of the types sometimes employed as reinforcing pigments in rubber. We have found that, in general, carbon blacks containing polyethylene formulations have a substantially higher initial power factor than virgin polyethylene and that on prolonged, simultaneous exposure to moisture and ultraviolet light the power factor of some carbon black stocks increases quite rapidly until after 500 to 1000 hours (in a Weatherometer) the power factor may approach or exceed the maximum power factor specification of $50 \times 10^{-4}$ at 20 megacycles. An explanation of this phenomenon is not known.

We have further found that certain carbon blacks have the power to increase the rate at which polyethylene absorbs oxygen at moderately elevated temperatures, even in the presence of powerful amine-type and phenol-type antioxidants. The addition of carbon black seems to destroy a substantial portion of the antioxidant action of even the better amine-type and phenol-type chemical antioxidants. These effects, however, are not always reflected in visible physical properties of the polyethylene and the adverse dielectric and chemical effects of carbon black may pass unnoticed. Since the electrical and electronic industries are ever pushing on to the use of higher voltages and frequencies, it has become imperative that a better method of stabilizing olefin polymers such as polyethylene against heat, moisture and ultraviolet light be discovered, and especially a means for preserving, for long periods of outdoor exposure, the excellent initial dielectric properties of virgin polyethylene.

In accordance with the present invention, however, we have found that olefin polymers, and particularly polyethylene, can be formulated so as to have a low and essentially stable power factor under conditions of outdoor weathering by dispersing in the polymer a small amount of a silicon monoxide pigment having an average composition represented by the formula $(SiO_2)_x \cdot (Si)_y$ wherein $x$ and $y$ are integers. The addition of such a pigment produces a formulation, for example in polyethylene, having a much lower initial power factor (than when carbon black is added) which remains substantially constant during the course of more than 1500 hours accelerated Weatherometer exposure (water and u.v. light). Other silicon pigments such as fumed silica, silica aerogel and the like have severely deleterious effects on the dielectric properties.

The amount of the silicon monoxide or "monox" pigment required for this use is quite small. In general, only about 0.5 to 2 percent by weight based on the weight of polymer is required. This amounts to only about $\frac{1}{10}$ or $\frac{1}{40}$ of the minimum conventional filler or pigment proportions. For example, for filler or reinforcing use, a minimum of about 20 parts per hundred of polymer (p.h.r.) of most fillers are required to materially increase hardness and stiffness. In fact, the amount of monox required is not critical since as little as about 0.3 to 0.5 percent will provide a significant stabilization of dielectric properties. As much as 10 percent or more may be utilized, although in general for insulation applications the amount should be kept as low as possible (between about 0.5 and about 5 percent) since the power factor and other dielectric properties are, in general, affected deleteriously by increasing filler content.

Silicon "monox" type pigments useful in the formulations and method of this invention are usually prepared by the reaction of sand ($SiO_2$) and carbon at high temperatures in a reducing atmosphere, such as by reaction in an arc furnace, and allowing the gases containing SiO (or having a composition approximating SiO) to condense in a partial or an essentially complete vacuum or vacuum chamber, in an inert atmosphere or gas, or in a reducing atmosphere or gas. Such procedures produce varied materials, all of which, however, may be characterized as a solid, particulate, disproportionated silicon monoxide having the average basic composition $(SiO_2)_x \cdot (Si)_y$.

If, in the above procedure, an inert condensing gas is employed, and such gas is purified so that it is essentially free of oxidizing gases, i.e. if it contains only a few parts of oxygen per million parts of inert gas, and such condensing gas is allowed to mix with gases from the electric arc without substantial turbulence, the resulting condensed, solid, disproportionated silicon monoxide will contain a high proportion of fibrous particles and may even be made up almost entirely of particles having a much greater length than width. When any appreciable amount of oxygen or oxidizing gases are present, and/or when conditions of turbulence obtain in the condensing gases, the silicon monoxide either will be converted to silicon dioxide of spherical shape or average length of the particles will be drastically reduced. This preferred fibrous type of silicon "monox" pigment will in general have a surface area of from about 60 to about 300 square meters per gram and the ratio of the diameter of the particles to their length will be from about 1:10 to about 1:50. Pigment of this type, and a method and apparatus for its manufacture, are more fully described in the copending application of Daniel S. Sears, Serial No. 433,020, filed May 28, 1954.

Another type of "monox" type pigment is disclosed in the copending application of Daniel S. Sears, Serial No. 433,099, filed May 28, 1954 wherein the silicon monoxide gas is mixed with an inert gas containing an amine such as ammonia, an alkyl amine, or an aryl amine to produce a material containing from about 1 to about 8 percent nitrogen and having a particle size, generally fibrous shape and surface area characteristics resembling that described above.

Still another "monox" type pigment of similar physical structure but seemingly differing markedly in the chemical nature of the particle surface is what may be termed a "hydrogen-monox." Such a material is prepared by carrying out the condensation-disproportionation of the silicon monoxide gas in the presence of hydrogen or a reducing gas capable of "furnishing" hydrogen. Such a product and process are more fully disclosed in the copending application of Arthur E. Van Antwerp, Serial No. 537,054, filed September 27, 1955. The condensation gas in this process may be hydrogen itself or any other gas that will furnish hydrogen to the mixture of silicon monoxide gas and inert condensing gas and which will remove oxidizing gases from the system or prevent their interference with the condensation of gaseous SiO to solid, fibrous, particulate $(SiO_2)_x \cdot (Si)_y$. Illustrative hydrogen-furnishing gases are methane, ethane, propane, butane and still other alkyl compounds which will crack or decompose in the presence of the hot SiO gas to furnish hydrogen in an active form suitable for removing residual oxidizing gases. Mixtures of the various hydrogen-furnishing gases can also be employed.

The above-described "hydrogen-monox" pigment may be thought of as having a reducing surface (which will react with, or absorb, iodine). In this it differs markedly from the above-described "$NH_3$-monox" described above. Otherwise, if the furnace conditions are properly controlled, as described on the above-mentioned copending application, a fibrous type pigment will be obtained which greatly resembles the other silicon monoxide type pigments in physical form but which is greatly preferred over the above-described other types of silicon monoxide pigments because (1) it provides the lowest initial power factor and dielectric constant, (2) the power factor of olefin polymer formulations containing it is virtually constant on very, very long periods of exposure to outdoor weathering conditions, (3) the physical properties of such formulations are better and more uniform, and (4) the hydrogen-monox form permits wider latitude in compound formulation so as to make possible better heat resistance, ozone resistance, and other physical and chemical properties.

Any of the above silicon monoxide pigments may be treated with organophilic substances to increase the ease of dispersion in organic polymers such as the various olefin resins and rubbers. In the copending application Serial No. 433,288, filed May 28, 1954, the coating of silicon monoxide type pigments with silicone type materials is disclosed. In the copending application Serial No. 433,290, filed May 28, 1954, there is disclosed the treatment of silicon monoxide pigments with polyhydric alcohols. The silicon monoxide type pigments may also be treated with certain amines. These coated silicon monoxide pigments, in general, disperse more readily in the olefin polymers of both the resinous and rubbery types.

The olefin polymers found useful in the compositions and method of this invention are any of the polymers made from monomeric mixtures comprising a predominant proportion of an olefin hydrocarbon such as ethylene, propylene, 1-pentene, 1-hexene, 1-octene, and others. The physical consistency of the polymer or of the formulation is not critical since the polymer or the formulations may range from liquid or viscous semi-liquids such as what may be useful for plotting compounds to solid resinous, high molecular weight polymers and copolymers. Of primary importance, however, are the high molecular weight, solid polymers and copolymers of 1-monoolefinic hydrocarbons such as ethylene, propylene, 1-butene, 1-pentene, 1-octene, and the like. The latter preferred class of monomers are readily converted to resinous polymers of high molecular weight which are excellent dielectric materials.

The polymers and copolymers of ethylene are particularly preferred, firstly because such monomers are most easily converted to hard, strong resinous materials, secondly because the resulting resins have best dielectric properties, and thirdly because these resins can be made in high molecular weight ranges where they are highly crystalline, have unusually great strength, inertness, etc., and have high heat distortion characteristics. The new, so-called "low-pressure" polyethylenes made by the use of heavy metal organo-metallic catalysts are especially valuable since they have heat distortion temperatures (i.e. crystal melting points) in excess of 120° C. Other types made by supported metal oxide catalysts are also useful. The more common so-called "high pressure" or general purpose polyethylenes have excellent properties in extruded wire coverings and cable jackets when compounded according to this invention.

The silicon monoxide pigments, according to the method of this invention, should preferably be uniformly distributed through, or dispersed in, the polymeric material. This may be accomplished in many ways, for example, by adding the solid, finely-divided pigment to a liquid or viscous resin or to a solution or dispersion of resin in solvents, followed by evaporation or removal of solvents, etc. Likewise, the pigment may be milled into the semi-solid or solid polymer, or it can be masticated into the polymer by pre-mixing small granules, cubes, or powdery resin or rubber with the finely-divided pigment and then passing the powdery or granular mixture through mill rolls, Banbury type mixers, extruders and the like. Prior to, simultaneous with, or subsequent to the addition of the silicon monoxide pigment other compounding and formulating agents such as lubricants, plasticizers, mold release agents, other fillers, pigments and reinforcing agents, age-resistors, stabilizers and antioxidants, curing agents, dyes and coloring pigments, and other substances may be added to the polymer. The finished formulation may be shaped into sheets, films, rods, tubes, etc., or it may be granulated, pulverized or otherwise compacted and/or reduced to a size conveniently employed for molding, calendering, injection molding, extrusion or solution coating.

The invention will now be more fully described with reference to several specific examples which are intended as being illustrative only.

*Examples I to IV*

A commercially-available form of polyethylene known as "Alathon G," believed to be made by the so-called "high pressure" process is mixed on a hot rubber mill roll (240–280° F.) with either 1 or 2 parts by weight per 100 parts of resin (phr.) of (Example I) a fibrous "hydrogen-monox" type of pigment made by the condensation-disproportionation of silicon monoxide gases in the presence of a hydrogen-furnishing gas (Example II), 2 phr. of another sample of a fibrous "hydrogen-monox" pigment (Example III), 2 phr. of a fibrous "$NH_3$-monox" made by the condensation-disproportionation of silicon monoxide in an inert condensing gas containing anhydrous ammonia, and (Example IV) 1 or 2 phr. of a fibrous "$N_2$-monox" pigment made by the condensation-disproportionation of silicon monoxide in substantially pure nitrogen. Mixing of each sample is continued for a total of about 15 minutes to insure good dispersion and care is taken to prevent loss of the very finely-divided pigment. The resulting sample formulations are molded in the form of standard discs such as are employed as specimens in the power factor and dielectric constant tests. The discs are mounted on cedar panels for accelerated exposure in a standard Weatherometer at 145° F. under high humidity and ultraviolet light. Before doing so, however, the power factor of the fresh disc is taken according to a procedure similar to A.S.T.M. D-150-44T.

As controls, similar discs are prepared from the same resin both in the unpigmented state and as formulations containing (a) 2 phr. of "Kosmos BB," a commercially-available fine H.C.C. type black recommended for polyethylene, (b) 2 phr. of "Santocel," a commercially-available silica pigment used as a "flatting" agent and said to be a finely-divided porous silica aerogel, (c) 2 phr. of "Hi-Sil 233," a commercially-available fine silica pigment for rubber, plastics, etc., (d) 2 phr. of "Cabosil," still another commercially-available fine silica pigment, and (e) 2 phr. of a very fine arc-type silica made by the condensation of $SiO_2$ vapors. All of the above-described test specimens are Weatherometer exposed and their dielectric constant determined at regular intervals. The data are as follows:

are performed on the other pigments employed as controls in Examples I to IV. The data are as follows:

| Pigment | Reducing Capacity, milliequiv./gm. | Silicon Content (Percent Si) | Power Factor×10⁻⁴ (at 20 meg.) |
|---|---|---|---|
| Example I ($H_2$-monox) | 0.034 | 23.2 | 17.85 |
| Example II ($H_2$-monox) | 0.052 | 24.7 | 21.88 |
| Example III ($NH_3$-monox) | 0.000 | | 22.27 |
| Example IV ($N_2$-monox) | 0.052 | 23.8 | 17.63 |
| "Santocel CS" | 0.000 | 0.000 | 16.75 |
| "Hi-Sil 233" | 0.000 | 0.000 | 28.0 |
| "Cabosil" | 0.000 | 0.000 | 8.33 |
| Arc Silica (e of Preceding example) | 0.000 | 0.000 | 7.50 |

*Examples VII and VIII*

A recently-available, "low pressure" type of polyethylene characterized as having a density of about 0.95, a crystal melting point of 125 to 130° C. and a yield point

| Sample | Power Factor After Hours Exposed [1] | | | | | | | | | |
|---|---|---|---|---|---|---|---|---|---|---|
| | Initial | 100 | 200 | 300 | 400 | 500 | 750 | 1,000 | 1,250 | 1,500 |
| Virgin Polyethylene | 4.78 | 8.04 | 15.78 | 20.37 | 25.53 | 31.29 | [3] | [3] | [3] | |
| Example (I) ($H_2$-monox): | | | | | | | | | | |
| 1 phr | 9.66 | 5.56 | 7.56 | 8.54 | 7.53 | 6.88 | 9.03 | 13.18 | 13.58 | 16.11 |
| 2 phr | 17.85 | 10.77 | 10.41 | 10.39 | 10.06 | 8.75 | 12.23 | 14.17 | 14.67 | 16.58 |
| Example (II) ($H_2$-monox) | 9.52 | 11.33 | 11.00 | 10.67 | 10.55 | 9.61 | [2] | [2] | [2] | [2] |
| Example (III) ($NH_3$-monox): 2 phr | 22.27 | 13.09 | 19.81 | 15.56 | 11.00 | 10.18 | 16.41 | 17.96 | 20.63 | 22.44 |
| Example (IV) ($N_2$-monox): 2 phr | 17.63 | [2] | [2] | [2] | [2] | [2] | [2] | [2] | [2] | [2] |
| Sample (a) "Kosmos BB" | 25.18 | 24.04 | 24.42 | 25.18 | 24.53 | 26.50 | 26.11 | 26.09 | 22.45 | 23.01 |
| Sample (b): "Santocel" | 16.74 | 22.47 | 35.21 | 42.51 | 43.43 | 47.27 | 58.6 | [3] | [3] | [3] |
| Sample (c): "Hi-Sil 233" | 28.00 | 51.15 | 53.20 | 56.83 | 51.09 | 61.05 | 64.5 | [3] | [3] | [3] |
| Sample (d): "Cabosil" | 8.33 | 14.03 | 23.26 | 30.94 | 33.13 | 36.13 | 36.58 | 45.5 | [3] | [3] |
| Arc Silica (e) | 7.47 | 10.97 | 19.37 | 31.25 | 42.61 | [3] | [3] | [3] | [3] | [3] |

[1] Values above are multiplied by 10⁻⁴, taken at 50 meg.
[2] Not run.
[3] Not run because compound exceeded specification (40 × 10⁻⁴).

In the above data it will be noted that the silicon monoxide samples all had a low initial power factor which, in some cases decreased slightly at first, and then increased but slowly with time. The "Kosmos BB" carbon black sample, however, had a higher initial power factor which increased with exposure time and then came back down. The special value of the hydrogen-monox containing samples is easily seen because after 1500 hours exposure they still have a power factor below the initial value of the carbon black sample. The silica pigment containing samples failed the test since they all exceeded the 40×10⁻⁴ specification after only 100-500 hours.

*Example V*

The hydrogen-monox type pigments of Examples I and II are incorporated into "Alathon G" in proportions ranging from 0.5 to 4 phr. The initial power factors of these samples show the effect of loading as follows:

| $H_2$-Monox | Loading | Power Factor × 10⁻⁴ at 20 meg. |
|---|---|---|
| Example II | 0.5 | 6.77 |
| Do | 1.0 | 9.66 |
| Do | 2.0 | 17.85 |
| Do | 1.0 | 10.63 |
| Do | 2.0 | 13.07 |
| Do | 4.0 | 19.89 |

*Example VI*

In an attempt to discover why the silicon monoxide pigments of Examples I to V stabilized polyethylene, the pigments are analyzed for (1) the reducing capacity of the pigment and (2) silicon (Si) content. The hydrogen-monox, the nitrogen-monox and $NH_3$-monox pigments are tested for reducing capacity expressed as milliequivalents of iodine reduced to iodide. Similar tests of 4000 to 5000 (a hard, tough, highly crystalline form of polyethylene having a materially higher molecular weight and more linear structure than "high pressure" polyethylene) is likewise compounded with 2 phr. of the "$H_2$-monox" mentioned above and then converted to test specimens is found to form a highly desirable dielectric for heavy duty wire and cable insulation. Like the silicon monoxide containing samples of the previous examples, the power factor is initially lower than a similar carbon black stock and the power factor remains low on continued exposure. Similar results are obtained with copolymers of ethylene containing up to about 10 percent propylene (made by low pressure methods, these copolymers resembling high pressure polyethylene).

We claim:

1. A plastic composition characterized by stable dielectric properties comprising a resinous polymer made from monomeric materials consisting of 1-monoolefinic hydrocarbons having dispersed therein from about 0.3 to about 10 percent by weight, based on said olefin polymer, of a finely-divided silicon monoxide pigment.

2. A composition as defined in claim 1 wherein the said polymer is a solid polyethylene resin.

3. A composition as defined in claim 1 wherein the said polymer is a solid polymer of ethylene having a heat distortion temperature in excess of about 120° C.

4. A plastic composition characterized by low power factor on exposure to moisture and ultraviolet light comprising a solid, resinous polymer of monomeric materials consisting of 1-monoolefinic hydrocarbons and predominating in ethylene having dispersed therein from about 0.5 to about 10 percent by weight of a finely-divided silicon monoxide pigment characterized by a substantially filamentary structure of a large proportion of its particles and a surface area of from about 60 to about 300 square meters per gram.

5. A composition as defined in claim 4 wherein the said polymer is polyethylene.

6. A composition as defined in claim 4 wherein said polymer is a high molecular weight, highly crystalline polyethylene having a heat distortion temperature in excess of 120° C.

7. A plastic composition characterized by low power factor on exposure to moisture and ultraviolet light comprising a solid, resinous polyethylene in which is dispersed from about 0.5 percent to about 5 percent by weight, based on said polyethylene, of a silicon monoxide pigment prepared by the condensation-disproportionation of silicon monoxide gases in the presence of the vapors of anhydrous ammonia.

8. A plastic composition characterized by low power factor on exposure to moisture and ultraviolet light comprising a solid, resinous polyethylene in which is dispersed from about 0.5 to about 5 percent by weight, based on said polyethylene, of a silicon monoxide pigment prepared by condensation of silicon monox vapors in the presence of a hydrogen-furnishing gas.

References Cited in the file of this patent

UNITED STATES PATENTS

| | | |
|---|---|---|
| 2,512,459 | Hamilton | June 20, 1950 |
| 2,681,327 | Brown | June 15, 1954 |
| 2,807,600 | Newton et al. | Sept. 24, 1957 |
| 2,823,980 | Sears | Feb. 18, 1958 |

FOREIGN PATENTS

| | | |
|---|---|---|
| 729,669 | Great Britain | May 11, 1955 |